United States Patent [19]

Dagn

[11] Patent Number: 4,467,636

[45] Date of Patent: Aug. 28, 1984

[54] TESTING INSTRUMENT FOR PIPES OR OTHER CAVITIES TO BE TESTED AS TO TIGHTNESS

[76] Inventor: Josef Dagn, Schwendter-Str. 231a, 6345 Kössen (Tirol), Austria

[21] Appl. No.: 407,167

[22] Filed: Aug. 11, 1982

[30] Foreign Application Priority Data

Aug. 11, 1981 [DE] Fed. Rep. of Germany ... 8123556[U]

[51] Int. Cl.$^3$ ............................................. G01M 3/28
[52] U.S. Cl. ........................................ 73/49.8; 138/89
[58] Field of Search ...................... 73/49.8; 138/89, 90

[56] References Cited

U.S. PATENT DOCUMENTS

| | | | |
|---|---|---|---|
| 100,456 | 3/1870 | Schutt | 73/49.8 |
| 2,607,370 | 8/1952 | Anderson | 138/90 |
| 3,950,983 | 4/1976 | Slinger | 73/49.8 X |
| 4,235,100 | 11/1980 | Branchini | 73/49.8 X |
| 4,328,837 | 5/1982 | Dagn | 138/89 |

FOREIGN PATENT DOCUMENTS 575397 2/1946 United Kingdom ................. 138/90

*Primary Examiner*—Gerald Goldberg
*Assistant Examiner*—Joseph W. Roskos
*Attorney, Agent, or Firm*—Cushman, Darby & Cushman

[57] ABSTRACT

The testing instrument for pipes or other cavities to be tested as to tightness includes an at least partially conical rubber plug, at each of the opposite ends of which supporting plates are provided. A pipe which extends through the rubber plug is rigidly connected to the supporting plate at the end having a smaller diameter and is passed through the other supporting plate so as to be movable. A protruding section of the pipe is provided with a thread and a pedestal is screwed to the threaded section. Two eccentric levers are tiltably mounted to the pedestal diametrically opposite each other and rest on the supporting plate at the larger diameter of the rubber plug. A crown member is provided on the pipe, to which a CO testing apparatus is connected. Variations of the rubber plug are disclosed, with which various openings which are difficult to seal can be securely sealed.

6 Claims, 9 Drawing Figures

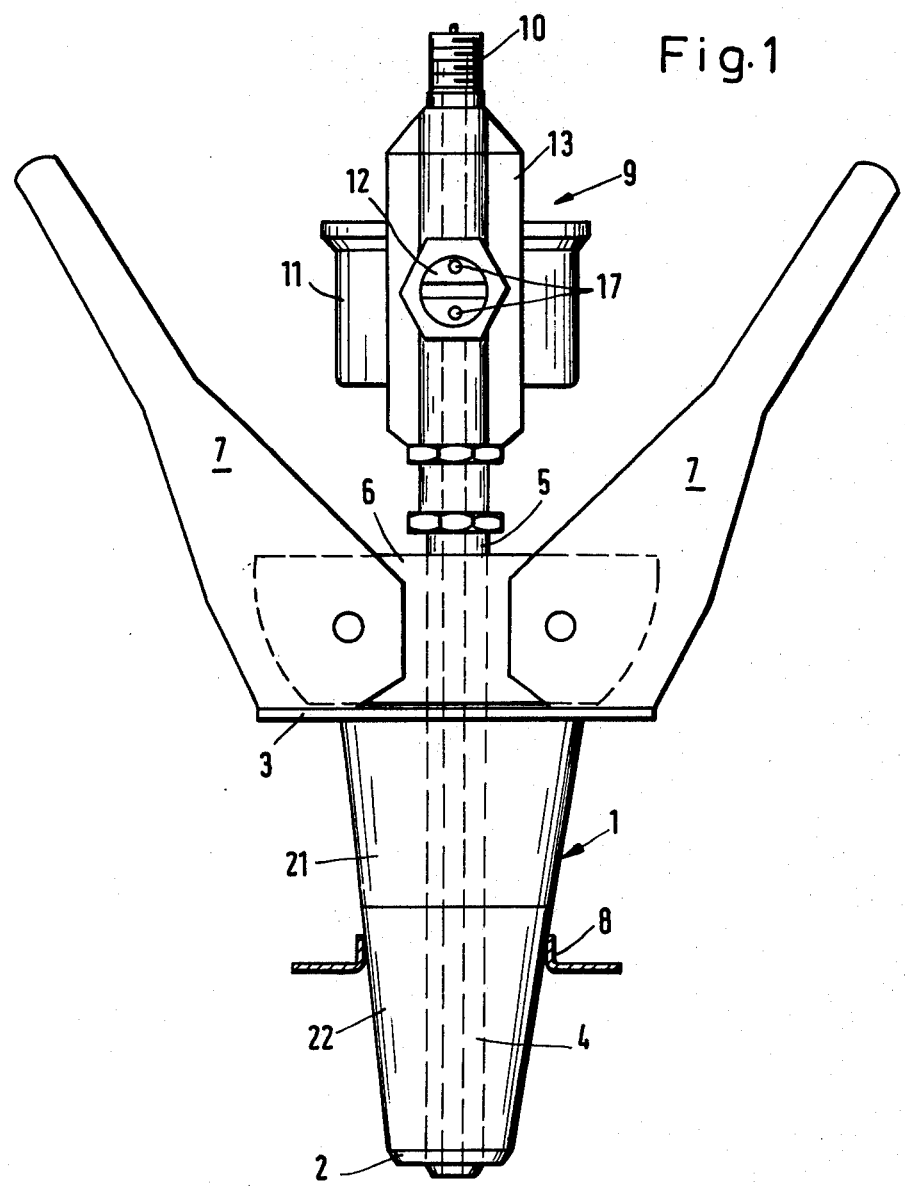

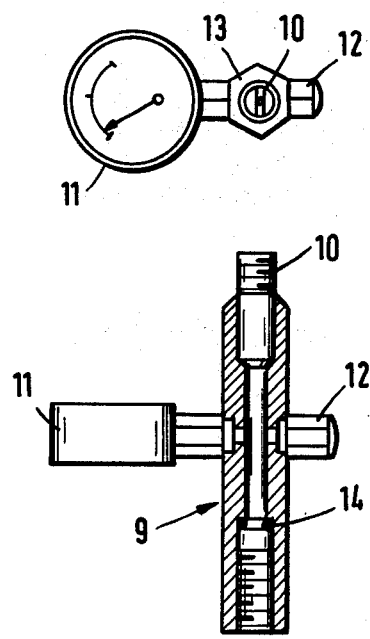
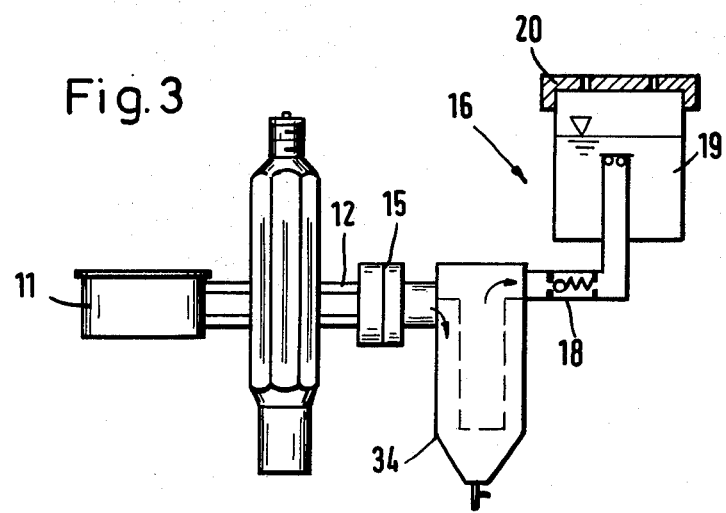

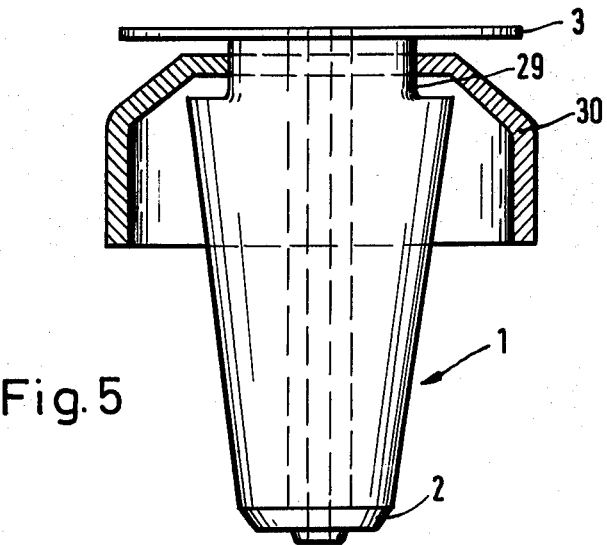
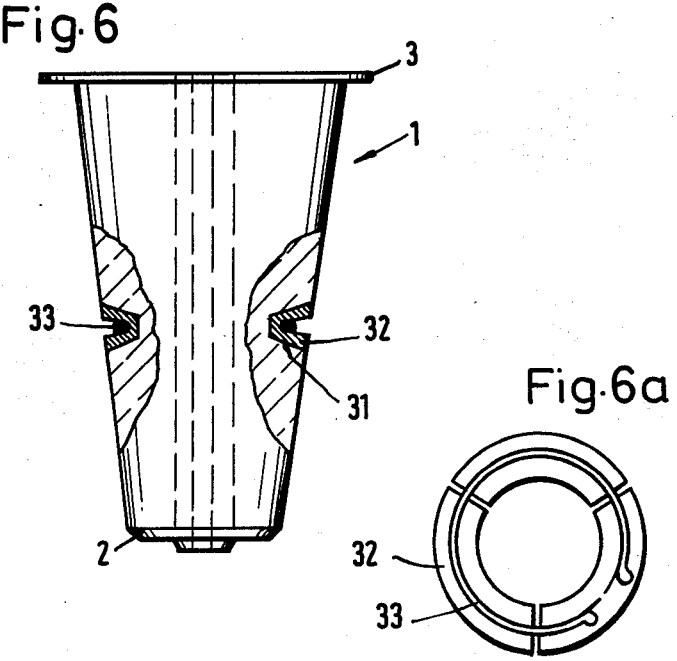

TESTING INSTRUMENT FOR PIPES OR OTHER CAVITIES TO BE TESTED AS TO TIGHTNESS

This invention concerns a testing instrument.

It is the object of the invention to embody a testing instrument of this type such that it can be used for a variety of purposes.

A threaded portion of a pipe which protrudes through a cam-tightenable tapered plug of the testing instrument is provided with a crown member comprising a valve, a manometer and a pop valve. It is only necessary to have a pressurised air source so as to be able to carry out the necessary test of tightness. The pop valve serves as a safety device in case of excessive testing pressure.

A CO (i.e. carbon monoxide) testing apparatus also is mounted to the crown member.

The inventive testing instrument can be used for a variety of applications since various shaped openings, into which the testing instrument has to be inserted, can be securely sealed.

Embodiment examples of the invention will now be described in the following with reference to the drawing, in which:

FIG. 1 is a side view of an inventive testing instrument with crown member,

FIG. 2 is a plan view and side view of the crown member,

FIG. 3 is a schematic drawing of a CO testing apparatus which is connectable to the crown member, FIG. 5 shows a further embodiment example of the rubber plug, and FIG. 6 shows a still further embodiment example of the rubber plug with a partial view in FIG. 6a.

Figure 4:
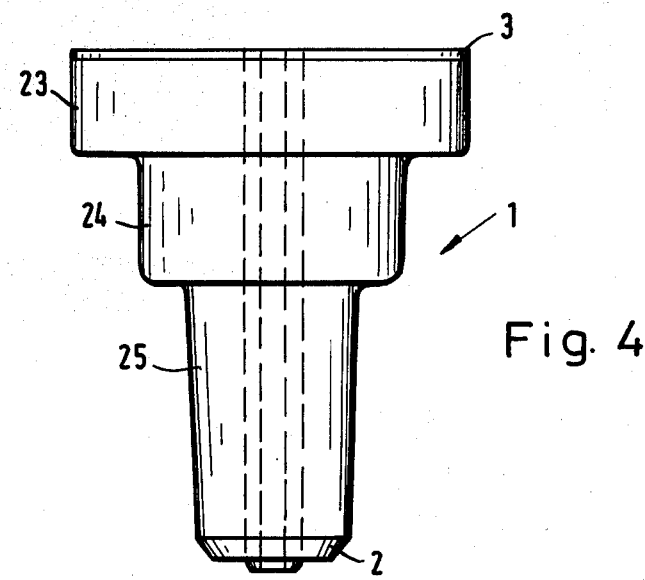
FIG. 4 shows a modified embodiment of the rubber plug with partial views in FIGS. 4a and 4b.

Referring first to FIG. 1, a conical rubber plug 1 is shown, at each of whose opposite ends supporting plates 2 and 3 are arranged which consist preferably of metal. Through the rubber plug 1 runs a pipe 4 which is rigidly connected to the lower supporting plate 2 and passes through the upper supporting plate 3 so as to be movable. The pipe is provided with an external thread on the section 5 extending above the upper supporting plate 3, and a pedestal 6 is screwed thereon. Eccentric levers 7, which rest on the upper supporting plate 3, are tiltably mounted on the pedestal 6 and are arranged diametrally opposite each other. By tilting the eccentric levers in FIG. 1 downwardly, the upper supporting plate 3 is depressed relatively to the pipe 4, whereby the rubber plug 1 is widened to seal an opening illustrated schematically at 8.

A crown member 9, which is formed by a pipe, is screwed onto the section 5 of the pipe 4 above a knee piece or a straight joining piece, and a conventional pneumatic tyre valve 10 is disposed at the free end thereof. A manometer 11 and a pop valve 12 are screwed into a cross hole of the crown member 9 so as to be arranged diametrally opposite each other. At least one section of the pipe is provided with a hexagonal profile 13 so that it can be screwed on with a wrench. As illustrated in FIG. 2, an annular seal 14 is provided opposite the pipe section 5 for sealing the crown member. A hexagonal profile is also provided on the pop valve 12 and on the manometer 11.

After inserting the rubber plug into the opening 8 of a cavity, the tightness of which is to be tested, and tilting the eccentric levers 7, compressed air can be introduced at the valve 10. The manometer 11 shows the testing pressure and a possible decrease in the testing pressure after a certain time. The pop valve 12 is set to a maximum testing pressure which prevents damage to the parts to which pressure is applied. The testing apparatus is particularly suitable for car radiators, for pipes and the like.

In the embodiment example shown in FIG. 3, a quick-fitting pipe union 15 is provided on the pop valve 12, by means of which a CO testing apparatus 16 can be connected to the pop valve. The outlet of the pop valve (17 in FIG. 1) opens into the CO testing apparatus 16. The air streaming out of the pop valve 12 passes through a water trap 34, and from there it passes through a check valve 18 into a reservoir 19 filled with a test liquid and closed by means of a cover 20 provided with ventilation openings. The test liquid 19 changes colour as soon as a certain amount of CO is contained in the air leaving the pop valve 12. Another test medium can be provided instead of the test liquid, in which case the water trap 34 may possibly be omitted.

In the embodiment example in accordance with FIG. 1, the rubber plug 1 consists of two sections 21 and 22 which have different degrees of hardness. The upper section 21, which is of larger diameter, consists of a softer rubber material, whereas the lower section 22, which is of smaller diameter, consists of a harder rubber material. More even widening of the rubber plug over its entire length is achieved by dividing it into at least two sections having different degrees of hardness. The embodiment example of a rubber plug 1 shown in FIG. 1 is particularly suitable for testing cylinder heads in motor cars.

The rubber plug 1 in accordance with FIG. 1 has the same amount of taper over its entire length. It is, however, also possible to embody individual sections having various amounts of taper.

For the sake of simplicity, only the rubber plug 1 is illustrated in case of the embodiment examples in accordance with FIGS. 4 to 6. In the embodiment example shown in FIG. 4, the rubber plug 1 comprises three sections, each having a different diameter. The uppermost section 23 having the largest diameter is disc-shaped and offset by means of a shoulder with respect to the middle section 24 which is slightly conical, whereas section 23 can have a cylindrical peripheral surface. A conical section 25, which has a greater length than the other sections 23 and 24, follows, being offset by a further shoulder. The sections 23 to 25 may be made of the same rubber material, but they consist preferably of rubber material having various degrees of hardness. Section 23 preferably consists of soft rubber material, section 24 of harder rubber material and section 25 of an even harder rubber material, in which case the longer section 25 may again be subdivided into sections of various hardnesses as was described with reference to FIG. 1.

Figure 4B:
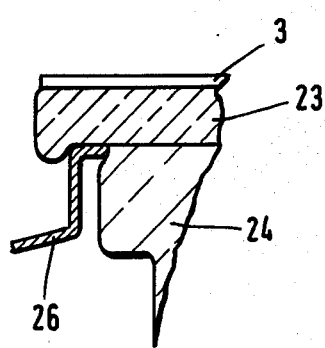
Figure 4A:
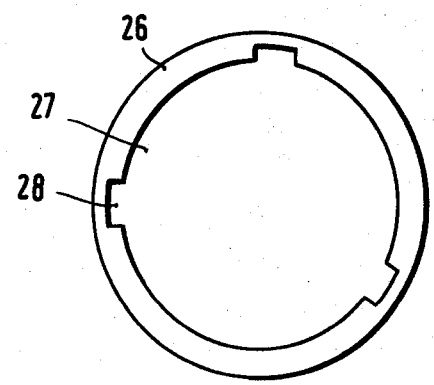

The rubber plug 1 shown in FIG. 4 serves in particular for sealing openings, the inner surfaces of which are not smooth. FIG. 4a shows a plan view of such an opening in the case of a motorcar radiator. The opening cross-section 27 surrounded by the filler tube 26 has cutouts 28 which are gripped by corresponding projections on the radiator cap. Due to these cutouts 28, the opening cross-section 27 cannot be sealed by pressing the rubber plug 1 against its periphery, in accordance with FIG. 1. In order to nevertheless produce a seal, the rubber plug shown in FIG. 4 is inserted such that the section 24 rests against the inner periphery of the opening cross-section 27 and the rubber plug grips in the opening as shown in FIG. 4b when the rubber plug is widened by being pressed together by means of the eccentric levers 7. At the same time, the disc-shaped section 23 is pressed across the upper edge of the filler tube 26, so that a seal is produced at the upper side of the latter, as is illustrated in FIG. 4b. In a corresponding manner, radiator or tank openings and the like can be sealed which have a rough inner thread or other irregularities at their edge. The conical section 25 on the rubber plug 1 illustrated in FIG. 4 serves for sealing openings with a smooth inner edge in accordance with FIG. 1.

FIG. 5 shows an embodiment example in which a section 29 of reduced diameter is embodied on the upper end of the rubber plug 1, and the inwardly projecting flange of a union nut 30 rests on this section 29. When the rubber plug 1 is relaxed, the union nut 30 is movable relative to the rubber plug 1, while the section 29 comes to rest on the flange of the nut and fixes it when the rubber plug 1 is widened. This embodiment is provided in particular for smooth conical openings which are provided with an external thread onto which the union nut 30 for holding the rubber plug in the opening can be screwed. The widening rubber plug produces the seal. If a cavity filled with a liquid is tested as to tightness, such as for instance a car radiator, water may leak out of the opening when the rubber plug 1 is relaxed, and this water will be deflected downwardly by the union nut 30. The union nut 30 can then be screwed off after the pressure in the tested cavity has been relaxed.

FIG. 6 shows yet another embodiment example which is suitable in particular for conical smooth openings which may also be greasy with the result that the widened plug 1 cannot hold its grip. A snap ring groove 31, which has approximately a V cross-section, is embodied on the circumference of the rubber plug 1. Ring segments 32 are arranged in this snap ring groove 31, the cross-sections of which correspond to that of the snap ring groove 31 and which consist of a material having a high coefficient of friction or are at least provided on the outside with a coating having an increased coefficient of friction. By way of example, metal grains may be disposed on the outer side of the ring segments 32 or a carborundum coating may be applied thereto. Upon compression of the rubber plug 1 by means of the eccentric levers 7 and due to the bevelled side flanks of the snap ring groove 31 and the corresponding surfaces of the ring segments 32, the latter are pressed outwardly, whereby they are pressed against the conical wall of the opening (not shown) and hold the rubber plug 1 in the opening while the other sections of the rubber plug 1 seal it. It is meaningful to secure the ring segments 32 in the snap ring groove 31 by means of a spring washer 33 as shown in FIG. 6a. A multiple of such snap ring grooves and corresponding ring segments 32 mounted therein may also be provided over the length of the rubber plug 1.

I claim:

1. A testing instrument for pipes or other cavities to be tested as to tightness, comprising:
    an at least partially conical rubber plug, at each of the two opposite ends of which respective supporting plates are provided;
    a pipe extending through the rubber plug and rigidly connected to the said supporting plate at the plug end having a smaller diameter;
    said pipe being passed through the other said supporting plate so as to be movable;
    said pipe being provided on a protruding section thereof with a band of threading;
    a pedestal screwed to said band of threading;
    a pair of eccentric levers being tiltably mounted on said pedestal diametrally opposite each other, these levers resting on the said supporting plate at the larger diameter of the rubber plug;
    a crown member constructed and arranged to be screwed onto the end of said protruding threaded section of the pipe beyond said pedestal, said crown member being formed by a piece of pipe with an open outer end normally closed by an openable valve;
    a manometer and a pop valve arranged at beside of the piece of piping and respectively laterally communicated therewith;
    said pop valve being provided with a quick-fitting pipe union for connecting with said piece of piping a CO testing apparatus which comprises a reservoir filled with a test medium;
    a water trap being interposed between the quick-fitting kpipe union and the reservoir.

2. A testing instrument according to claim 1, wherein:
    the at least partially conical rubber plug is provided in at least axially adjoining two sections having different degrees of hardness, a said section with the smallest diameter being made of harder material than an axially adjoining said section.

3. A testing instrument according to claim 1, wherein:
    the rubber plug comprises at least one shoulder between a section with a range of larger diameters and a section with a range of smaller diameters.

4. A testing instrument according to claim 1, wherein:
    an inwardly projecting flange of a union nut which is movable on the rubber plug when the rubber plug is relaxed, is arranged at the upper end of the rubber plug on a section of reduced diameter compared with an axially adjoining section of said rubber plug.

5. A testing instrument according to claim 1, wherein:
    means defining at least one snap ring groove having approximately V-shaped cross-section is provided on the circumference of the rubber plug;
    a plurality of ring segments being arranged in said snap ring groove, the cross-sections of which correspond to that of the snap ring groove, and said ring segments having outer sides with an increased coefficient of friction thereon.

6. A testing instrument according to claim 5, wherein:
    the ring segments are held in the snap ring groove by means of a spring washer which surrounds them.

* * * * *